Patented Nov. 15, 1949

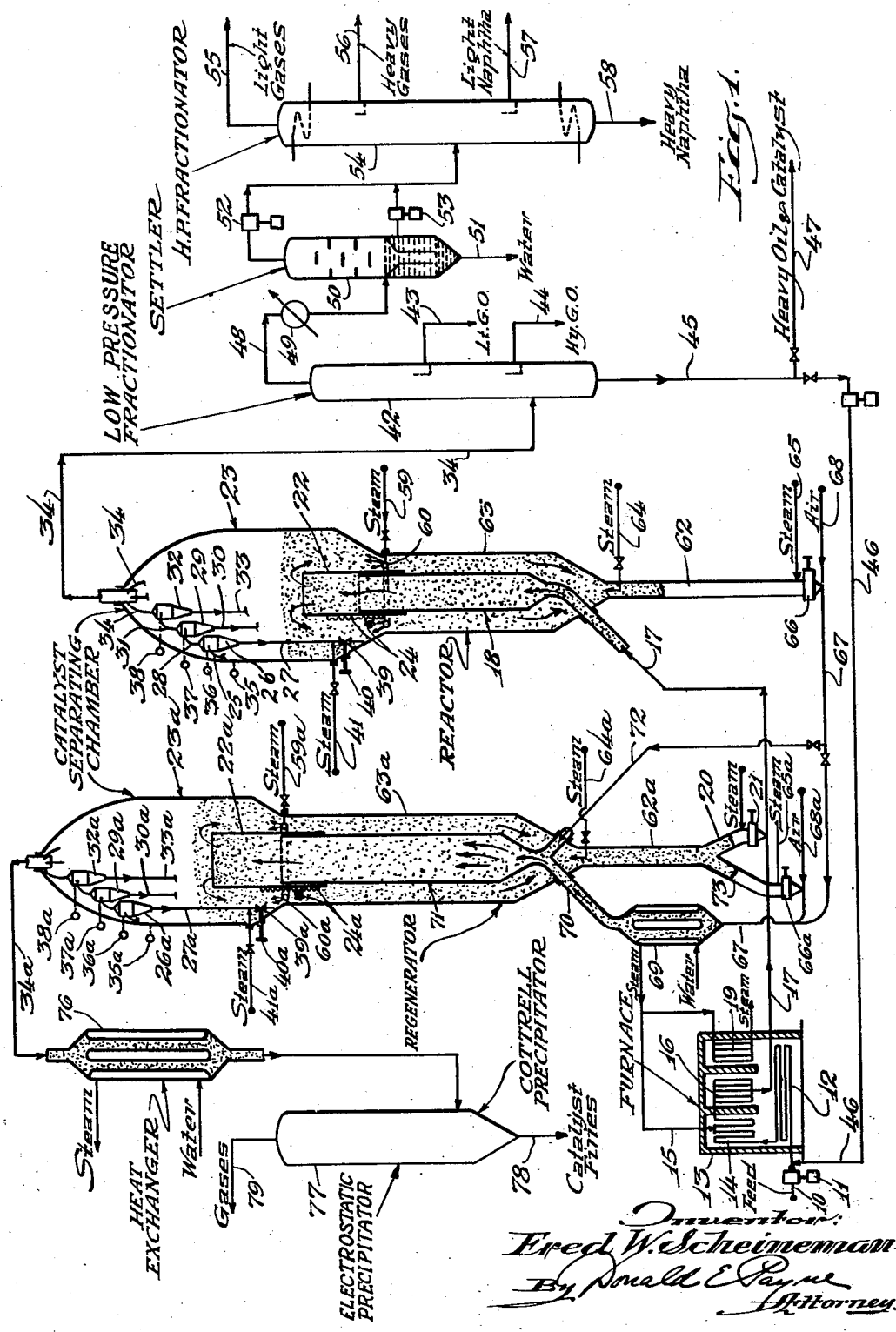

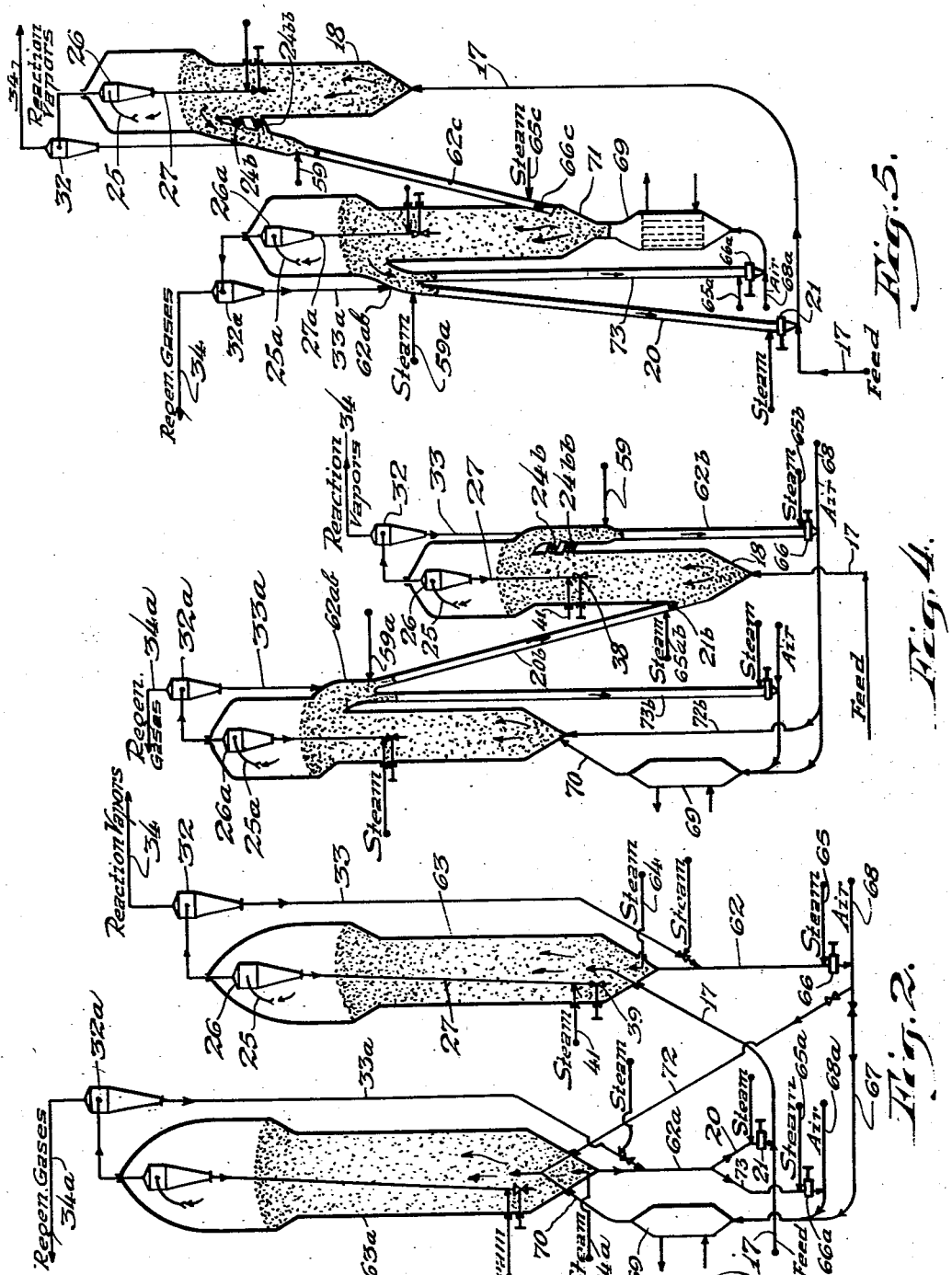

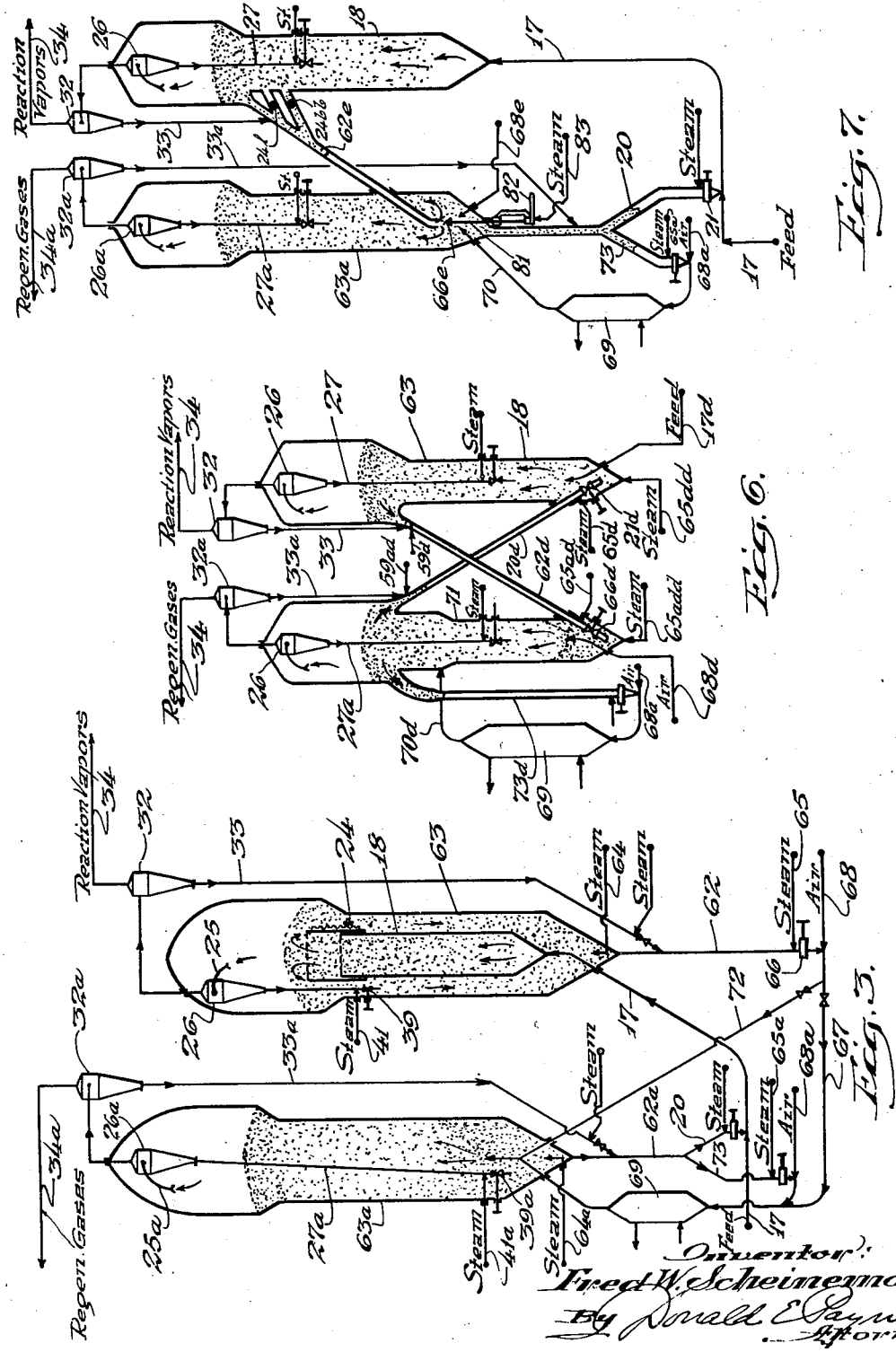

2,488,029

UNITED STATES PATENT OFFICE 2,488,029

CATALYTIC CONVERSION SYSTEM

Fred W. Scheineman, Chicago, Ill., assignor to Standard Oil Company, Chicago, Ill., a corporation of Indiana Application July 3, 1941, Serial No. 400,956

25 Claims. (Cl. 196—52)

This invention relates to improved systems for employing fluidized powdered catalyst for effecting various reactions and it pertains more particularly to hydrocarbon conversion systems employing a powdered catalyst which is suspended in hydrocarbon gases or vapors for effecting conversion and is subsequently suspended in regeneration gases for the combustion of carbonaceous material. This application is a continuation-in-part of my copending application Ser. No. 372,541, filed December 31, 1940 (now U. S. Patent 2,353,-505), also of my copending application Ser. No. 390,201, filed April 24, 1941 (now U. S. Patent 2,337,684), and also of my copending application Ser. No. 392,848, filed May 10, 1941. Certain of the features of apparatus and operation herein set forth are separately described and claimed in the following applications: Page Ser. No. 376,763, filed January 31, 1941, and Gunness Ser. No. 400,958, filed July 3, 1941. Related applications include Johnson Ser. Nos. 392,846-7, both filed May 10, 1941, and applicant's continuation-in-part application Ser. No. 440,566, filed April 27, 1942.

The powdered or fluid type catalytic hydrocarbon conversion system may employ a wide variety of catalysts, charging stocks, operating conditions, etc. for effecting hydrogenation, dehydrogenation, desulfurization, isomerization, reforming, alkylation, gas reversion, polymerization, synthesis, aromatization, isoforming, etc. but it is particularly applicable to the catalytic cracking of gas oils and heavier hydrocarbons for the production of high quality motor fuels.

In a powdered or fluid type catalyst system one of the most serious problems is that of effecting complete separation of the powdered catalyst from reaction product gases and vapors after the conversion step and effecting complete separation of regenerated catalyst from regeneration gases after carbonaceous material has been burned from the catalyst. Enormous amounts of catalyst must be handled by such systems and it is essential that extremely effective catalyst separation means be provided for minimizing catalyst losses. An object of my invention is to reduce the catalyst losses in such a conversion system to less than .01%.

A further object is to reduce the cost and simplify the operation of systems for separating finely divided solids from gases or vapors. A further object is to provide a new and improved arrangement of centrifugal or cyclone separators within a single separation chamber. A further object is to provide improved means for operating a multi-stage cyclone separator system, for automatically regulating the pressure differential across each stage, for insuring smooth and uniform flow of separated solids from each stage and for minimizing the number and size of pipes, hoppers, etc. and the necessary amount of apparatus required for accomplishing the desired separation.

An important object of the invention is to provide an improved method and means for insuring the desired amount of powdered catalyst in an upflow reactor regardless of the rate at which catalyst is being introduced into the reactor and regardless of the variations in pressures, temperatures, etc. which might cause surging. When powdered catalyst is subjected to upflowing gases or vapors at certain critical gas or vapor velocities a dense, turbulent suspended catalyst phase is produced which differs sharply from the light, dispersed catalyst phase which is produced by higher vapor velocities. An object of my invention is to provide a method and means for utilizing this dense, turbulent suspended catalyst phase phenomena. A further object of my invention is to avoid the light, dispersed catalyst phase as far as this is practically possible. A further object is to provide method and means for withdrawing catalyst from one dense, turbulent suspended catalyst phase without its passing through a light, dispersed phase, stripping the withdrawn catalyst and introducing it into another dense, turbulent suspended catalyst phase.

A further object of my invention is to provide a system wherein one reactor is at a different pressure than the other so that dense phase catalyst may be withdrawn from one reactor, stripped and introduced into the dense phase of another reactor without at any time passing through a light, dispersed phase. A further object is to provide improved methods and means for transferring catalyst from one reactor to another, for regulating the amount of catalyst in reaction zones, and for generally simplifying the construction and operation of powdered catalyst conversion systems.

A further object of the invention is to provide an improved combination of a reactor or a regenerator with catalyst separation, stripping, and handling systems which will minimize fluctuations in operating conditions and at the same time be more simple and less expensive than systems heretofore employed for this purpose. Other objects of the invention will be apparent as the detailed description thereof proceeds.

While certain aspects of my invention are in no way limited to hydrocarbon conversion processes but are applicable to any system for separating finely divided solids from gases or fluids, the invention is primarily directed to hydrocarbon conversion systems and I will describe a specific example of the invention as applied to a catalytic cracking system. In this system I superimpose a catalyst separation chamber over a reaction chamber or a regeneration chamber, or both. The major part of the catalyst separation in the superimposed chamber is effected by settling so that the bulk of the solids are removed from the gases or vapors before they reach the cyclone separator inlets which communicate with the space in the top of the reactor.

In practicing my invention I may provide a multi-stage cyclone system inside the separation chamber itself and at the upper part thereof. By placing the multi-stage cyclone system inside the enlarged separation chamber I effect marked economies in construction costs not only because of the extra piping, hoppers, supports, etc. that would be required for external mounting but because relatively thin walled cyclones can be used. If the cyclones were outside the separation chamber they would have to withstand full operating pressure but when they are mounted inside the separation chamber they need only withstand a pressure of about 1 or 2 pounds per square inch. By mounting the cyclones inside the separation chamber the dip legs from the cyclones may discharge directly into a common hopper and be sealed by an aerated mass of solids in said chamber.

An important feature of my invention is the maintenance in the hopper at the base of the separation chamber of a mass of aerated-solids which mass is of such density that it behaves like a liquid. One dip leg or set of dip legs extends from primary cyclones well below the surface of this dense liquid-like mass of aerated solids. Another dip leg or set of dip legs extends from the secondary cyclone or cyclones to a point well below the upper level of the fluent mass of aerated-solids. Still other dip legs or sets of dip legs will extend from a third cyclone stage, etc.

When the cyclones are geometrically and compactly arranged so as to substantially fill the upper part of the chamber, the dip legs from the center cyclones may have to be slightly inclined because of the center inlet pipe in the base of the separation chamber. I may avoid the use of inclined dip legs and avoid the use of any bends in dip legs by mounting the cyclones around the periphery of the separation chamber in which case each of the dip legs will be vertical and adjacent the outer wall of the separation chamber. With such an arrangement the valve in the dip leg may be at the upper part thereof and a mechanical stirrer may be employed in the lower part thereof, the shaft for the stirrer extending through a stuffing box in the laterally extending portion of the lower chamber wall to external driving means. Such mechanical stirrers may be employed in standpipes as well as in the cyclone separator dip legs.

Each dip leg may be slightly flared, i. e., be of slightly greater diameter at its bottom than at its top so as to prevent any tendency toward the bridging of solids therein. Each dip leg may also be provided with a valve and with a means immediately above or below said valve for aerating or blowing out solids which have accumulated in the dip leg. The proper functioning of each cyclone separator may be indicated by pressures in various parts of the system and if pressure differentials indicate that a particular cyclone is not properly functioning the dip leg associated therewith may be aerated or blown free of obstruction by external control means without interrupting continuous separation of the system and without the necessity of actually obtaining access to the cyclone separator.

The pressure differential between the various cyclones and the chamber in which they are enclosed is balanced by the head of settled solids in each dip leg. The level of the fluent settled solids in the primary cyclone dip legs will be lower than the level in the secondary cyclone dip legs and that level in turn will be lower than the level in the tertiary cyclone dip legs, etc.

For efficient operation the bulk of the solids should be separated from the gases or vapors in the enlarged chamber before these gases or vapors are passed through the multi-stage cyclone system. The enlarged chamber directly above the reactor may act as a settling zone from which catalyst particles may settle out of the upper light, dispersed catalyst phase either into the lower dense, turbulent suspended catalyst phase or into a hopper overflow pipe or standpipe in which the catalyst is stripped and from which the catalyst is transferred to another reactor. If there are any constrictions between the top of the reactor and the enlarged chamber such constrictions should be sufficiently small in magnitude to prevent a transfer of catalyst from the dense, turbulent suspended catalyst phase into the dilute dispersed catalyst phase. In other words, the dense catalyst from the dense, turbulent suspended catalyst phase flows directly therefrom (i. e., without passing through a light, dispersed catalyst phase) into a hopper overflow pipe or a standpipe and it is stripped in this standpipe to remove any substances which might be deleterious in the reactor to which it is being transferred. Catalyst is knocked back into the system and preferably into the overflow or standpipe by means of the cyclone separators which are preferably mounted inside of the enlarged separator, but which may of course be mounted outside of the separator. Dense phase catalyst may be withdrawn directly from the upper part of the dense, turbulent suspended catalyst phase, or from an intermediate or bottom point. In any case the drawoff line or standpipe must be sufficiently large to permit not only aeration but actual stripping. Where the level of one reactor or the pressure in that reactor is sufficiently high the withdrawn catalyst may be introduced directly into another reactor without the aid of injection gas and without passing through a light, dispersed catalyst phase. My invention is applicable to a large variety of systems which will hereinafter be discussed in greater detail.

The invention is particularly applicable to hydrocarbon conversion processes such as catalytic cracking in which case the solids may be finely divided or powdered catalyst particles and the separating chamber may be mounted above a reactor or regenerator. The reactor or regenerator may, in fact, be positioned in the base of the separator itself and construction costs may thus be minimized. Various other features of the invention will be apparent from the following detailed description of a specific embodiment thereof as applied to a catalytic cracking system.

In the accompanying drawings which form a part of this specification and wherein similar parts are designated by like reference characters:

Figure 1 is a schematic flow diagram of the catalytic cracking unit employing my improved catalyst separation and transfer system;

Figure 2 is a schematic vertical plan illustrating bottom dense phase draw-offs from both reactors;

Figure 3 is a schematic vertical plan illustrating a top dense phase withdrawal from one reactor and a bottom dense phase withdrawal from the other reactor;

Figure 4 is a schematic vertical plan illustrating dense phase transfer from an upper regenerator to the bottom of a lower reactor wherein the catalyst remains in dense phase condition throughout the transfer and stripping operations;

Figure 5 is a schematic vertical plan illustrating dense phase transfer from an upper reactor to a dense phase regenerator wherein the stripping and the transfer is effected without passing the catalyst through a light, dispersed phase;

Figure 6 is a schematic vertical plan illustrating a side-by-side reactor arrangement wherein the overflow pipe from each reactor extends directly to the base of the other reactor below the point of the fluid inlet so that stripping and catalyst transfer is effected without catalyst passing through a light, dispersed phase; and Figure 7 is a schematic vertical plan of a system wherein dense phase catalyst is transferred from the top of the reactor to the bottom of the regenerator and catalyst is transferred from the bottom of the regenerator to the bottom of the reactor.

To illustrate my invention I will describe a system for the catalytic cracking of gas oil or heavier hydrocarbons by means of a catalyst of the silica-alumina or silica-magnesia type. This catalyst may be prepared by the acid treating of natural clays, such as bentonite, or by synthetically preparing a silica-alumina or silica-magnesia mixture. An excellent catalyst may be prepared by ball-milling silica hydrogel with alumina or magnesia using about 2 to 30%, for example about 15 or 20%, of alumina or magnesia. The ball-milled dough may be dried at a temperature of about 240° F. and then activated by heating to a temperature of about 900 to 1000° F. Another method of preparing a highly active cracking catalyst is to form a gel from dilute sodium silicate in the presence of an aluminum salt by the addition of excess dilute sulfuric acid. The resulting gel is preferably boiled for an hour or two with an excess of dilute ammonium hydroxide solution before washing, after which it is dried and heated as in the previous example. The silica-alumina catalyst may be rendered more stable at high temperatures by the addition thereto of zirconia in either smaller or larger amounts than alumina. The ball-milled silica-magnesia catalyst may be improved by preheating the magnesia with a thorium nitrate solution so that the finished catalyst may, for instance, have the following composition:

| | Per cent |
|---|---|
| Silica | 66 |
| Magnesia | 27 |
| Thoria | 7 |

No invention is claimed in the composition or preparation of catalyst per se and no further description of the catalyst is, therefore, necessary.

The catalyst in this specific example is in powdered form with a particle size of about 1 to 100 microns, i. e., with about 50% of the catalyst passing a 400 mesh screen. The invention is applicable, however, to other catalyst sizes provided only that the catalyst be of such size and density that it may be aerated and handled as a fluid in the manner herein described. Higher gas or vapor velocities may be required for coarser catalyst particles, but these particles may be of such size as to be retained on a 400, 300, 200, 100, 50 or even 10 mesh screen.

The density of the catalyst particles per se may be as high as 160 pounds per cubic foot but the bulk density of catalyst which has settled for 5 or 10 minutes will usually be from 25 to 40 pounds per cubic foot. With slight aeration, i. e., with vapor velocities of about .05 to .5 foot per second, the bulk density of 1–100 micron catalyst will be about 20 to 30 pounds per cubic foot. With vapor velocities of about 1 to 2 or 3 feet per second the bulk density of such catalyst may be about 10 to 20 pounds, for example, about 15 to 18 pounds per cubic foot. It is at such gas or vapor velocities that powdered catalyst is maintained in the dense, turbulent suspended catalyst phase. At higher vapor velocities or in settling zones the bulk density of catalyst may be less than 5 pounds per cubic foot or even less than 1 pound per cubic foot and it is under such conditions that the catalyst is said to be in the light, dispersed phase. The dilute phase may contain as little as 50 grains per cubic foot. Generally speaking, the catalyst in the dense, turbulent suspended catalyst phase has a bulk density of 1 to 5 and preferably of at least 10 pounds per cubic foot greater than the bulk density of the light, dispersed catalyst phase. Aerated catalyst in the overflow pipes or standpipes, even while undergoing stripping, may have the bulk density of 20 to 30 or more pounds per cubic foot, i. e., at least 1 and preferably 5 pounds per cubic foot heavier than the dense, turbulent suspended catalyst phase.

Gas oil feed stock from line 10 is introduced by pump 11 to convection coils 12 of pipe still 13. The preheated oil is then vaporized in radiant coils 14. Steam may be introduced in line 15 at this point to insure complete vaporization and I may employ a separator (not shown) for removing unvaporized oil from charging stock vapors. The vapors are then superheated in radiant coils 16 and introduced through transfer line 17 to the base of reactor 18. The transfer line temperature may be about 800 to 1050° F., for example about 900 to 925° F., as it leaves the furnace. The pressure at this point may be atmospheric to about 50 pounds per square inch, for example, about 15 pounds per square inch. Steam may be superheated in radiant coils 19 to a temperature of about 800 to 1000° F., for example, about 900° F. for supplying the process steam for aerating catalyst in the system and a part of this steam may be introduced into transfer line 17.

Regenerated catalyst from standpoint 20 is introduced by star feeder or slide valve 21 into transfer line 17 so that the weight ratio of catalyst-to-oil will be about 1:1 to 15:1 or higher, for example about 4:1 to 5:1. The pressure above the valve or star feeder 21 is sufficiently greater than the pressure in transfer line 17 to prevent any upward flow of charging stock vapors through the standpipe. The catalyst discharged through valve 21 is suspended in charging stock vapors and introduced thereby at the base of reactor 18.

The reactor may be a cylindrical chamber provided with a cone-shaped bottom and the reactor should be of sufficient cross-sectional area to give a vertical vapor velocity therethrough of about .4 to 4 or usually about 1½ to 2½ feet per second. In order to maintain the desired catalyst density in the reactor process steam may be introduced in various amounts for increasing or decreasing vapor velocity in the reactor and the total amount of steam may range from about 2 to 20% by weight but is usually about 10% by weight based on stock charged.

The reactor may be designed to provide a vapor contact time of about 10 to 20 seconds and a catalyst residence time in the reactor of about 1 to 10 or 20 minutes or more. The temperature in the reactor may be about 825 to about 1000° F., as for example 900 to 925° F., and the pressure about 8 to 15 pounds per square inch.

The reaction vapors carry suspended catalyst out of the reactor through conduit 22 into an enlarged separating chamber 23. The enlarged separating chamber does not always have to be of greater diameter than the reaction chamber because even in a reaction chamber of uniform diameter an interface may be established between dense, turbulent suspended catalyst phase and an upper light, dispersed catalyst phase. I prefer, however, to employ a settling chamber of larger effective cross-sectional area than the reactor so that catalyst may settle out of the upper light, dispersed catalyst phase into the dense, turbulent suspended catalyst phase. Thus, the bulk of the catalyst may be prevented from ever reaching the cyclone separators and the gases or vapors which enter this cyclone separation system may contain only about 400 grains of catalyst per cubic foot, or even a lesser amount but usually more than 50 grains per cubic foot.

Conduit 22 may be slidably mounted around reactor 19 and it may be raised or lowered by a rack and pinion mechanism 24 or by any other mechanically or pneumatically operated mechanism for varying the effective height of the reactor. I prefer to have the top of conduit 22 extend into the enlarged section to such an extent that a considerable depth of settled or separated catalyst will be provided above the outwardly extending portion of the chamber bottom.

Within separation chamber 23 I provide a three-stage cyclone separation system with four sets of primary, secondary and tertiary cyclones respectively. A geometric arrangement of these cyclones may be employed if it is desired to obtain maximum utilization of the space in the top of the separating chamber. I prefer, however, to arrange the cyclones around the outer walls of the chamber so that all dip legs will be substantially vertical. These dip legs should extend below the level of the settled catalyst in the hopper overflow pipe or standpipe and by having them terminate above the outwardly extending portion of the chamber bottom, I may obtain easy access thereto for regulating catalyst flow therein or for cleaning, repair, replacement, etc.

The inlet pipes 25 pick up the gases at substantially equally spaced points and introduce the gases tangentially into primary cyclones 26 imparting a swirling motion to the gases and throwing catalyst solids to the periphery of the cyclone. The catalyst is skimmed from such periphery by conventional means and conducted to dip leg 27 which extend to a point well below the level of settled catalyst in the chamber.

Gases from cyclone 26, which may contain about 80 grains of catalyst per cubic foot, are conducted by pipe 28 to secondary cyclone 29 from which separated catalyst is withdrawn through dip leg 30. Gases from the secondary cyclone, which gases may contain about 30 or 40 grains of catalyst per cubic foot, are conducted by pipe 31 to tertiary cyclone 32 from which catalyst is discharged through dip leg 33. Gases from the tertiary cyclone, which gases may contain about 10 or 20 grains of catalyst per cubic foot, may be withdrawn through discharge lines 34 or may be passed through further cyclone separation stages or through an eletctrostatic precipitator or other separation means.

With a pressure of 8 pounds in chamber 23 the pressure in primary cyclone separator 26 may be about 7½ pounds, the pressure in secondary cyclone 28 may be about 7 pounds and the pressure in tertiary cyclone 32 may be about 6½ pounds per square inch. This pressure differential causes a variation in the level of catalyst in the various dip legs. Thus the level of settled catalyst in dip leg 27 will be sufficiently higher than the level of settled catalyst in chamber 23 to allow for a pressure differential of about ½ pound. The level in dip leg 30 will be sufficiently high to allow for a pressure differential of about 1 pound and the level in dip leg 33 will be sufficiently high to allow for a pressure differential of about 1½ pounds.

Each of the cyclones may be connected to a separate pressure gauge outside of the separator chamber, the pressure in the separator chamber being indicated by gauge 35, that in the primary cyclone by gauge 36, in the secondary cyclone by gauge 37 and in the tertiary cyclone by gauge 38. The readings on these pressure gauges will indicate whether or not the cyclones are properly functioning.

If any dip leg loses its pressure head of settled catalyst valve 39 may be closed by external operating means 40 until the desired catalyst levels have been re-established. If any dip leg becomes plugged with settled catalyst valve 39 may be closed and the dip leg may be blown free of catalyst by steam or other inert gas introduced through line 41. It should be understood of course that a similar steam line may be provided immediately below the valve as well as immediately above the valve. Various modifications and alternative arrangements will be apparent to those skilled in the art from the above description it being desirable that externally controlled means be provided for insuring the proper function of each of the several cyclone stages within the enlarged separation chamber. It should be understood that while the drawings have been somewhat simplified each cyclone may be provided with its separate pressure indicator, dip leg, etc. and each dip leg provided with its separate valve closures, steam lines, etc.

The reaction products from line 34 may be fractionated in any conventional system but I prefer to separate the heavier-than-gasoline fractions at the relatively low pressure, then remove water and subsequently fractionate the lighter hydrocarbons at higher pressures. Thus the reaction products may be introduced into a low pressure fractionator 42 from which a light gas oil side stream may be withdrawn through line 43, a heavy gas oil fraction may be withdrawn through line 44 and a residual fraction containing small amounts of unremoved catalyst may be withdrawn from the bottom through line 45 and recycled through line 46 or withdrawn from the system through line 47.

The overhead from fractionator 42 may be passed through line 48, cooled in cooler 49, introduced into settler 50 from which condensed water may be withdrawn through line 51. The gases from this settler may be compressed by compressor 52 and the liquids pumped by pump 53 to a pressure of about 135 to 150 pounds per square inch and then fractionated in any suitable system or systems 54 from which light gases are withdrawn through line 55, a $C_3$—$C_4$ hydrocarbon fraction through line 56, light naphtha through line 57 and heavy naphtha or gasoline through line 58.

Before the spent catalyst from separating chamber 23 is regenerated it is essential that it be stripped with steam or inert gas for the recovery of hydrocarbons therefrom. Most of this stripping may be effected in the upper part of the standpipe by introducing process steam through line 59 to distributor 60. The stripped and aerated catalyst then proceeds downwardly through standpipe 62 which is of sufficient height to build up the necessary pressure for introducing the catalyst into the regeneration system.

Figure 1 illustrates a system wherein catalyst flows from the separating chamber around the reactor to the top of standpipe 62. The enlarged conduit 63 through which the spent catalyst flows may either be considered as the lower part of separating chamber 23 or the upper part of standpipe 62. By surrounding the reactor with separated catalyst in this manner I insure substantially uniform reactor wall temperatures since any radiation losses will be from the spent catalyst rather than from the reaction chamber. Also the reaction chamber walls may be fabricated from less expensive steel. The thickness of the annular space between reactor 18 and chamber 63 may be relatively small but should be sufficient to permit adequate stripping as well as aeration. Steam for effecting this stripping and aeration may be introduced at the base of chamber 63 through line 64.

Instead of entirely surrounding the reactor by chamber 63 this chamber or the upper part of standpipe 62 may be an independent conduit adjacent the reactor or it may be an independent conduit extending downwardly through the reactor. Savings in construction costs as well as in heat losses may be effected, however, by utilizing at least a part of the reactor wall as a part of the standpipe wall in constructing both reactor and standpipe as an integral unit. The standpipe should be sufficiently tall to provide for the necessary catalyst head at its base, which in this example is about 20 pounds per square inch. The catalyst in the lower part of the standpipe is aerated by steam introduced through line 65.

Spent catalyst is discharged through valve or star feeder 66 into line 67 and picked up by air introduced through line 68 which conveys the catalyst through cooler 69 and line 70 to the base of regenerator 71. The spent catalyst, of course, may be introduced at the base of the regenerator directly through line 72. The regenerator and the separation system mounted above the regenerator are similar in design and operation to the reactor and the separation system above the reactor respectively so that no further description is required. The regenerator is designed to operate with vertical gas velocities of about .4 to 4 feet per second, usually about 1½ to 2½ feet per second and to provide for a catalyst residence time in the regenerator of about 5 or 10 minutes although the residence time will depend, of course, upon the amount of carbonaceous material that must be burned.

It is desirable to keep the regeneration temperature within the range of about 950 to 1050° F. for example about 1000° F., and it is hence necessary to abstract heat from the regeneration system. If the spent catalyst is cooled in heat exchanger 69 to a temperature of about 300 to 400° F., the heat of regeneration may be absorbed in the catalyst itself and utilized for raising the temperature of the catalyst to 1000° F. If it is desired to introduce catalyst at a higher temperature level I may recycle about 2 or 3 volumes of regenerated catalyst (per volume of spent catalyst undergoing regeneration) through leg 73 of standpipe 62a and cooler 69 by introducing a part of the air through line 68a. Thus where all of the spent catalyst is returned directly to the regenerator through line 72 I may recycle about three times that amount of regenerated catalyst through branch 73, through cooler 69 and cool it to a temperature of about 840° F. or lower so that the average temperature of catalyst introduced at the base of the regenerator will be about 850° F. or lower.

When three volumes of regenerated catalyst are recycled for each volume of spent catalyst introduced into the reactor the temperature increase may be only about 150° F. Without recycling the temperature increase may be about 600° F. In any case the actual temperature in the regenerator is substantially constant and uniform throughout, preferably at 1000° F. The regenerator volume may be effectively changed to provide for alternative methods of operation and to regulate the catalyst residence time in the regenerator by providing a false head 22a slidable on the upper open end of regenerator 71.

Any heat exchange fluid may be used in exchanger 69 but I prefer to use water and to generate steam by the heat absorbed from the hot spent or recycled catalyst. Additional steam may be generated by passing regeneration gases from line 34a through a down-flow heat exchanger 76 en route to Cottrell precipitator 77. Residual catalyst fines are removed in this Cottrell precipitator through line 78 and they may either be admixed with fresh or regenerated catalyst and returned to the hopper or top part of separating chamber 23a or they may be agglomerated or reworked in any way for the preparation of catalyst material of larger particle size. Gases substantially free of catalyst are withdrawn from the system through line 79.

Regenerated catalyst from the base of leg 20 of standpipe 62a may be at a temperature of about 980 to 1050° F. and when this catalyst is admixed with in-coming charging stock vapors, in the manner hereinabove described, it furnishes the bulk of the heat required for the endothermic catalyst cracking process.

In the specific example hereinabove described, the cyclone separators were of the so-called Buell type wherein the swirling of the gases was effected by tangential introduction and wherein the catalyst was skimmed from the periphery of the swirling mixture, but other types of cyclone separators may, of course, be used. An example of another type of cyclone is the so-called multi-clone. In a multi-clone arrangement gases from the upper part of the separator 23 will be passed downwardly between concentric tubes and given a swirling motion by means of vanes in the annular space. The catalyst particles are thrown to the wall and slide down the outer tube while the gas is passed upwardly through the inner tube to the next separation stage. A plurality of such cyclones may discharge into a common hopper and a dip leg may extend from this hopper to a point below the level of the dense, turbulent suspended catalyst phase in the reactor or below the level of settled separated catalyst in the upper part of the standpipe or overflow vessel. While I prefer to return catalyst from the cyclone system to dense phase catalyst without having the separated catalyst pass through a light, dispersed phase, it should be understood that such separated catalyst may be returned to the system by means of gas injection.

In the above example I have described a multi-stage cyclone system mounted within the upper part of the reactor chamber or within the enlarged separation chamber which is in direct and unrestricted communication with the reaction chamber. The cyclone separators may of course be mounted outside the separator and separated catalyst may be either returned to the dense, turbulent suspended catalyst phase in the reactor or added to separated catalyst leaving the reactor through overflow lines or standpipes.

In Figures 2-7 I have illustrated various modifications of my invention and have diagrammatically indicated the cyclone separation as being both inside and outside of the enlarged separation chamber. A multi-stage system may be used inside or outside, or a part of the cyclones may be mounted inside and another part outside. The reactors in Figures 2-7 have been illustrated as of uniform cross-sectional area. It should be understood that the upper portions of any or all of these reactors may be enlarged as hereinabove described in connection with Figure 1. Dip legs from the cyclones may extend toward the outwardly extending wall at the bottom of the enlarged section.

Referring specifically to Figure 2, it will be noted that in effect I have lowered the reactor walls in Figure 1 until they have entirely disappeared so that the dense, turbulent suspended catalyst phase substantially fills at least the central part of chamber 63 and 63a. In this modification the cyclone dip legs discharge separated catalyst directly into the dense, turbulent suspended catalyst phase or into the lower aerated catalyst phase and provide a catalyst knock-back in each reactor which substantially prevents any catalyst from being withdrawn from the top of the reactor with gases or vapors. The hopper or overflow pipe in this case is the bottom of the reactor itself. The catalyst which settles out of the dense, turbulent suspended catalyst phase is stripped and aerated by steam, introduced through lines 64 and 64a and through lines 65 and 64a. The pressure in the top of each chamber may be about 8 pounds per square inch; the pressure in each chamber at the point of gas or vapor inlet may be about 12 or 13 pounds per square inch; and the pressure at the base of the standpipes may be about 18 to 20 pounds per square inch. The amount of catalyst in each reactor will depend in part on the catalyst inventory and in part by the control of valves 21 and 66. It should be understood of course that make-up catalyst may be added to the system as required from any suitable hopper and this make-up catalyst is preferably introduced to the top of the regenerator together with precipitated catalyst fines. In this embodiment catalyst is withdrawn from the bottom of each reactor in dense phase conditions, stripped while remaining in dense phase condition and then dispersed in a gas or vapor for re-introduction into a lower part of another chamber. It will be noted in this modification that cyclones 32 and 32a are illustrated as being mounted outside of the reactor and separation chamber and that dip legs 33 and 33a extend directly to standpipes 62 and 62a respectively. In this way, the finer catalyst particles are transferred to the other reactor instead of being knocked back into the same reactor.

In Figure 3 the regenerator operates in the manner of the regenerator of Figure 2 while the reactor operates in the manner described in Figure 1. In other words, dense phase catalyst is withdrawn from the top of the reactor and from the bottom of the regenerator. Alternatively, dense phase catalyst may be withdrawn from the top of the regenerator and from the bottom of the reactor respectively.

In Figure 4 I have illustrated a modification wherein the regenerator is mounted at a higher level than the reactor and wherein dense phase catalyst is withdrawn from the upper part of the dense turbulent suspended catalyst phase in the reactor, stripped with steam in the standpipe and then introduced directly and without passing through a light, dispersed phase into the dense, turbulent suspended catalyst zone in the reactor. In this modification I have illustrated the use of external overflow pipes or standpipes for withdrawing dense phase catalyst from the upper part of the reactor and regenerator respectively, but it should be understood that internal standpipes may likewise be employed.

The catalyst head between the top of standpipe 20b and valve 21b is sufficient to insure a pressure drop of at least 1 to 3 pounds across valve 21b and thus prevent hydrocarbon vapors from passing upwardly through this standpipe. If desired, a suitable baffle may be employed at the discharge end of standpipe 20b, for deflecting the upflowing hydrocarbon vapors away from the bottom end of this standpipe.

Instead of a telescopic tube arrangement of Figure 1 for controlling catalyst levels in the reactor, I have shown in Figure 4 multiple valved draw-off lines 24b and 24bb for this purpose.

In Figure 5 I have illustrated the modification wherein external overflow pipes or standpipes are employed and wherein dense phase catalyst is withdrawn from an upper part of the dense, turbulent suspended catalyst phase in the reactor, stripped with steam, and introduced directly into the lower part of the dense, turbulent suspended catalyst phase in the regenerator without the catalyst at any time passing through a light, dispersed phase.

In Figure 6 I have illustrated a side-by-side arrangement in which dense phase catalyst is withdrawn from the top of each reactor and introduced at the base of another reactor and wherein the stripping and the entire transfer is effected without changing the catalyst from dense phase to a light, dispersed phase condition. In this case the regenerated catalyst enters the reactor 18 from the bottom of standpipe 20d in amounts controlled by valve 21d after having been stripped with steam introduced through line 65d. The catalyst in the bottom of the reactor is maintained in aerated form by steam introduced through line 65dd. As catalyst is continuously introduced into the base of the reactor the level of this catalyst rises up to and above the point of oil vapor inlet from line 17d. Thereupon, this catalyst is suspended in the dense, turbulent phase through the reaction zone. Dense phase catalyst is removed from the top of this dense, turbulent suspended catalyst phase through overflow pipe or standpipe 62d wherein the catalyst is stripped with steam introduced through lines 59d and 65ad. The spent catalyst is then introduced at the base of the regenerator wherein it is maintained in aerated condition by steam or other aerating gas introduced through line 65add. The introduced catalyst gradually rises to and above the level of the air inlet 68d and is thereupon suspended in the dense, turbulent phase throughout the regenerator. The dense phase catalyst is withdrawn from the top of this dense, turbulent suspended catalyst phase through standpipe 20d wherein it is stripped with steam introduced through line 59ad and the line above valve 21d. Another portion of dense phase catalyst may be withdrawn from the top of the dense, turbulent aerated catalyst phase through overflow pipe or standpipe 73d and conveyed by air introduced from line 68a through the cooler 69. The cooled catalyst may be re-introduced into dense, turbulent suspended catalyst phase in regenerator 71 through line 70d. The diameter of the reactor may be enlarged at this point so that the desired dense phase conditions will prevail throughout the reactor. Catalyst is knocked back from gases leaving the reactor and regenerator and at least a part of this catalyst is returned through lines 33 and 33a to standpipes 62d and 20d respectively.

The operation of this system is dependent upon the difference in density of the catalyst in the reactors and in the standpipes, respectively. Thus assuming an effective standpipe height of forty feet, a catalyst density of 25 pounds per cubic foot in the standpipes and 15 pounds per cubic foot in the reactors, the pressure at the base of the standpipes will be about 2½ to 3 pounds per square inch greater than the pressure at the base of the reactors. Make-up catalyst must be added of course to maintain the catalyst inventory in the system at all times and valves 21d and 66d should be automatically operated to immediately close when the pressure in the base of the standpipes is not at least 1 to 2 pounds greater than the pressure in the base of the respective reactors.

In Figure 7 I have illustrated a modification wherein the reactor operates in the same manner as the reactor in Figure 5, i. e., with dispersed catalyst inlet at its base and dense phase catalyst withdrawal from its top. However, the regenerator in the modification of Figure 7 operates with a bottom catalyst draw-off in a manner similar to the regenerator in Figures 2 and 3 as distinguished from the top draw-off illustrated in Figures 4, 5 and 6. In this case the pressure in or elevation of, the reactor is sufficiently higher than the corresponding pressure in, or elevation of, the regenerator so that there is a positive flow of catalyst through overflow pipe or standpipe 62e into the lower part of dense, turbulent suspended catalyst phase in the regenerator section of chamber 63a.

The valve 66e for regulating the introduction of catalyst from standpipe 62e into tower 63a may be a conical closure supported on hollow stem 81 extending through a suitable stuffing box to external control means 82. Steam or other aerating gas may be introduced from line 83 through the hollow stem and through central or lateral ports extending from the hollow stem to the top or upper surfaces of closure member 80. Thus when the valve is in upper or closed position the steam may effect aeration of catalyst in standpipe 62e. When it is in the lower or open position the steam may disperse catalyst into the dense turbulent suspended catalyst zone. Such a valve or equivalent structure may be employed on all cyclone dip legs and standpipes which terminate inside a reactor, regenerator, or other closed chamber.

All of the above-described modifications utilize the phenomena that when powdered catalyst is in the dense, turbulent suspended phase condition it is uniformly distributed throughout the whole extent of this phase so that substantially identical temperatures prevail throughout the entire phase. Catalyst in any portion of this phase is of almost identical composition of catalyst in any other portion of the phase. The catalyst may therefore be introduced into the dense phase at the top, bottom or any intermediate point and when so introduced it will be instantaneously admixed throughout the whole of the dense, turbulent suspended catalyst phase. Similarly catalyst may be withdrawn from the top, bottom or any intermediate point of the turbulent suspended catalyst phase. The top draw-off provides the advantage of dense phase level control and increased pressure at the base of the draw-off pipe or standpipe. Bottom draw-off offers the advantage that the bottom pressure of the reactor is superimposed on the top of the standpipe. The many other advantages of the system generally and of the specific system will be apparent to those skilled in the art from the above detailed description.

An important feature of my invention is the minimizing of dispersed catalyst phase throughout the system and particularly the stripping of the catalyst in the over-flow pipes or standpipes and the arrangement of these standpipes for obtaining the necessary pressure differentials for positively insuring against the passage of gases or vapors from one reaction chamber to the other.

While I have described certain specific embodiments of my invention it will be noted that many other embodiments will be apparent to those skilled in the art from the above description. It will likewise be understood that specific operating conditions, arrangements of cyclones, dip legs, valves, etc. may be considerably varied without departing from the invention. In other words, while I have described certain specific examples, my invention is not limited thereto except as defined by the following claims.

I claim:

1. The method of operating a catalytic conversion system which comprises passing hydrocarbon vapors upwardly through a first zone containing powdered catalyst at such a rate as to produce a dense, turbulent suspended catalyst phase and a light upper dispersed catalyst phase at the top of said zone, passing regeneration gases upwardly through a second zone containing powdered catalyst at such a rate as to produce a dense, turbulent suspended catalyst phase and a light upper dispersed catalyst phase at the top of said zone, withdrawing catalyst from the first dense phase, stripping the catalyst and introducing the stripped catalyst into the second dense phase, withdrawing catalyst from the second dense phase and introducing it back to the first dense phase, separating catalyst from the light upper phases at the top of each zone and returning the separated catalyst to the system.

2. The method of claim 1 wherein catalyst is withdrawn from at least one of said zones at a point substantially above the bottom of the dense phase but within said dense phase.

3. In a catalytic conversion system for handling powdered catalyst, an upflow gas or vapor contacting chamber having an open upper end of substantially the cross-sectional area of the chamber itself, a settling chamber of larger cross-sectional area at least partially surrounding the upper part of said contacting chamber whereby dense phase catalyst material may overflow from the top of the contacting chamber into the space between said contacting chamber and said enlarged settling chamber and whereby catalyst may settle out of ascending gases or vapors in the upper part of said settling chamber, a second contacting chamber, means for transferring catalyst from said settling chamber to said second contacting chamber and for maintaining said catalyst in dense turbulent suspended catalyst phase in said second contacting chamber, means for aerating catalyst in said transfer means, means for withdrawing gases from the top of said second contacting chamber and means communicating with said second contacting chamber at a point substantially below said gas removal means for conveying catalyst from the dense phase in said second contacting chamber back to said first contacting chamber.

4. The method of operating a catalytic conversion system which comprises passing a first stream of gases or vapors upward through a first zone containing powdered catalyst at such a rate as to produce a dense turbulent catalyst phase, passing a second stream of gases or vapors upwardly through a second zone containing powdered catalyst at such a rate as to produce a dense turbulent suspended catalyst phase, maintaining a high dense phase catalyst level in said first zone, withdrawing catalyst from the upper part of said dense phase but below the high dense phase level and introducing it directly at a low point in the second contacting zone while maintaining the transferred catalyst at a bulk density of at least 10 pounds per cubic foot, downwardly withdrawing dense phase catalyst from said second zone and returning said catalyst to the first zone.

5. The method of claim 4 which includes the step of maintaining a high dense phase level in the second contacting zone and effecting the transfer of catalyst from an upper level of said second contacting zone to a lower level in said first contacting zone while maintaining the transferred catalyst at a bulk density of at least 10 pounds per cubic foot.

6. In a powdered catalyst conversion system wherein catalyst is continuously introduced into a contacting zone, and gases or vapors are passed upwardly through said contacting zone at such velocity as to maintain a dense, turbulent suspended catalyst phase superimposed by a dilute catalyst phase, the apparatus which comprises a vertical reactor, means for continuously introducing powdered catalyst into said reactor, means for continuously passing a gas or vapor upwardly through said reactor at such velocity as to maintain a dense phase of suspended catalyst therein, a vertical standpipe contiguous with said reactor and having an upper open end communicating with the interior of the reactor at an intermediate point therein, means for raising and lowering the effective level of communication between said standpipe and said reactor whereby the catalyst may overflow from said dense phase into said standpipe, and means for keeping the catalyst in said standpipe in aerated condition.

7. The method of operating a powdered catalyst conversion system which comprises introducing powdered catalyst into a regeneration zone, passing regeneration gases upwardly through said zone at such a rate as to produce a dense turbulent phase of suspended catalyst in a substantial part of said zone and a dilute catalyst phase at the top of said zone, continuously withdrawing gases from the upper part of the dilute catalyst phase and returning catalyst from said dilute phase directly to a dense catalyst phase in the system, separately withdrawing catalyst directly from said dense turbulent phase and transferring it therefrom as a downwardly moving aerated column, introducing said catalyst from the base of said column to a conversion zone, passing gases or vapors upwardly through said conversion zone at such a rate as to produce a dense turbulent phase of suspended catalyst in a substantial part of said zone and a light dispersed catalyst phase at the top of said zone, continuously withdrawing a product stream from the upper part of the dilute catalyst phase in the conversion zone, continuously transferring catalyst from the dense turbulent phase in said conversion zone to a stripping zone, stripping the catalyst with gas in said stripping zone, transferring said catalyst downwardly from said stripping zone, dispersing said catalyst into a gaseous stream and returning said catalyst as a suspension in said stream to said regeneration zone.

8. The method of operating a catalytic conversion process employing solid catalyst of small particle size which method comprises passing a first gas stream upwardly through a first zone containing said catalyst at such a rate as to produce a dense turbulent suspended catalyst phase and a light upper dispersed catalyst phase at the top of said zone, passing a second gas stream upwardly through a second zone containing such catalyst at such a rate as to produce a dense turbulent suspended catalyst phase and a light upper dispersed catalyst phase at the top of said zone, transferring catalyst from the first dense phase to a stripping zone, stripping the catalyst in said stripping zone, transferring stripped catalyst from said stripping zone into the second dense phase, withdrawing catalyst from the second dense phase as a downwardly moving aerated catalyst column of sufficient height and to provide the pressure required for catalyst transfer to the first dense phase, returning catalyst in fluent form from the base of said column back to the first dense phase, separating catalyst from the light upper phases at the top of the first and second zones and returning the separated catalyst to dense phase catalyst in the respective zones.

9. The method of claim 8 which includes the steps of employing upward gas velocities in each contacting zone within the approximate range of .4 to 4 feet per second.

10. The method of claim 8 wherein the second contacting zone is at a higher elevation than the first contacting zone, wherein the gas stream in the first contacting zone comprises hydrocarbons undergoing conversion and wherein the gas stream in the second contacting zone comprises air and combustion products.

11. The method of effecting hydrocarbon conversion with solid catalyst of small particle size which method comprises introducing hot regenerated catalyst suspended in a hydrocarbon gas or vapor stream at a low point in a conversion zone, passing said gases or vapors upwardly in said conversion zone at a velocity within the approximate range of .4 to 4 feet per second and at such a rate as to produce a dense turbulent suspended catalyst phase superimposed by a light upper dispersed catalyst phase, returning catalyst from said light dispersed catalyst phase to said dense phase, withdrawing catalyst from said dense turbulent suspended catalyst phase to a stripping zone, stripping the withdrawn catalyst in said stripping zone, withdrawing dense phase aerated catalyst from said stripping zone and dispersing it in a regeneration gas, passing said regeneration gas stream upwardly in the regeneration zone at an upward vertical velocity within the approximate range of .4 to 4 feet per second and at such a rate as to produce a dense turbulent suspended catalyst phase in said zone superimposed by a light dispersed catalyst phase, withdrawing regeneration gases from an upper part of the light dispersed catalyst phase, returning catalyst from the light dispersed catalyst phase to the dense turbulent catalyst phase in the regeneration zone, withdrawing catalyst from the dense turbulent catalyst phase in the regeneration zone as a downwardly moving aerated catalyst column of sufficient height to provide the pressure required for catalyst transfer to the conversion zone and resuspending said catalyst in the hydrocarbon gas or vapor stream for reintroduction into the conversion zone.

12. The method of operating a contacting process for solids of small particle size which method comprises passing a first gasiform stream into and upwardly through a first contacting zone containing solids of small particle size at such a rate as to produce a first dense turbulent solids phase and a light upper dispersed solids phase, passing a second gasiform stream into and upwardly through a second contacting zone containing solids of small particle size at such a rate as to produce a second dense turbulent suspended solids phase and a light upper dispersed solids phase, withdrawing solids as a first downwardly moving aerated column from said first dense phase at a point below the upper level thereof, said first column being of such height as to provide a pressure head at its base which is greater than the pressure of said second gasiform stream prior to its introduction into the second zone, introducing solids from the base of said first column into said second gasiform stream prior to its introduction into the second zone and introducing said solids suspended in said stream at a low point into the second contacting zone, withdrawing solids as a second downwardly moving aerated column from the second dense phase at a point below the upper level thereof, said second column being of such height to develop a pressure head at its base which is greater than the pressure of said first gasiform stream prior to its introduction into said first zone, introducing solids from the base of said second column into said first gasiform stream prior to its introduction into said first zone and introducing said solids with said first gasiform stream to a low point in said first contacting zone.

13. The method of operating a hydrocarbon conversion process employing catalyst solids of small particle size which method comprises passing a gasiform hydrocarbon stream into and upwardly through a conversion zone containing catalyst solids of small particle size at such a rate as to produce a first suspended dense turbulent catalyst phase and a light upper dispersed catalyst phase, passing a regeneration gas stream into and upwardly through a regeneration zone containing catalyst solids of small particle size at such a rate as to produce a second suspended dense turbulent catalyst phase and a second light upper dispersed catalyst phase, withdrawing catalyst solids as a first downwardly moving aerated column from the first suspended dense turbulent catalyst phase at a point below the upper level thereof, said first column being of such height as to provide a pressure head at its base which is greater than the pressure of said regeneration gas stream prior to its introduction into the regeneration zone, introducing catalyst solids from the base of said first column into said regeneration gas stream prior to its introduction into the regeneration zone and introducing said catalyst solids suspended in said stream at a low point into the regeneration zone, withdrawing catalyst solids as a second downwardly moving aerated column from said second suspended dense catalyst phase at a point below the upper level thereof, said second column being of such height as to develop a pressure head at its base which is greater than the pressure of said gasiform hydrocarbon stream prior to its introduction into the conversion zone, introducing solids from the base of said second column into said gasiform hydrocarbon stream prior to its introduction into the conversion zone and introducing the catalyst solids with the gasiform hydrocarbon stream at a low point in said conversion zone.

14. A method of regenerating spent or partially spent finely divided solid particles which comprises introducing spent finely divided solid particles and a gaseous regenerating medium into a regeneration zone and passing the gaseous medium through said regeneration zone at such a velocity to form a fluidized mass of solid particles in said regeneration zone and to effect the desired extent of regeneration, withdrawing at least a portion of the regenerated solid particles from the bottom portion of the fluidized mass in said regeneration zone, withdrawing another portion of the regenerated solid particles from the bottom portion of the fluidized mass, passing the last mentioned portion of regenerated solid particles through a heat exchanger for cooling the solid particles and returning the cooled regenerated solid particles to the lower portion of said regeneration zone to control the temperature of the solid particles undergoing regeneration.

15. A method according to claim 14 wherein said regeneration zone is provided with a bottom reservoir from the bottom of which regenerated solid particles are withdrawn.

16. A method of carrying out catalytic reactions which comprises introducing finely divided catalyst and reactant vapors into a reaction zone, introducing the vapors into said reaction zone at such a velocity to produce a relatively dense suspension of catalyst in said reaction zone, removing vaporous products from said reaction zone, withdrawing fouled catalyst as a relatively dense fluidized phase from the bottom portion of said reaction zone, mixing a regenerating gas with the fouled catalyst and introducing a mixture into the bottom portion of a regeneration zone, adjusting the velocity of the regenerating gas to maintain a relatively dense suspension of catalyst in said regeneration zone, withdrawing regenerated catalyst in a relatively dense condition from the bottom portion of said regeneration zone, returning a portion of the withdrawn regenerated catalyst to said reaction zone, passing another portion of the withdrawn regenerated dense phase catalyst to a cooling zone, cooling said portion and returning said cooled portion to said regeneration zone to control the temperature during regeneration.

17. A method of contacting solid particles and a treating agent which comprises introducing solid particles and a treating agent into a treating zone, introducing the treating agent into said treating zone at such a rate as to form a fluidized mass having a relatively high concentration of solid particles and having a level in said treating zone below the outlet from said treating zone, the space above the level being filled with a suspension having a relatively low concentration of solid particles in the said treating agent, withdrawing a portion of said solid particles from the bottom portion of the fluidized mass, passing the withdrawn solid particles through an indirect heat exchanger and returning the said solid particles to the said treating zone and withdrawing treated solid particles as a fluidized mass from the bottom of the said treating zone.

18. In a process for contacting gaseous materials with solids of small particle size the improved method of operation which comprises suspending such solids in a gaseous stream and passing said stream upwardly in a substantially vertical internal contacting zone at a rate to maintain a dense turbulent suspended solids phase in said zone superimposed by a light phase of low solids concentration in a separation zone above said internal contacting zone, laterally surrounding said internal contacting zone with solids in an external catalyst stripping zone which likewise communicates at its upper end with said separation zone, the upper end of said internal contacting zone being unrestricted so that dense phase solids may flow directly from the internal contacting zone to the external stripping zone while the solids remain in dense phase condition, effecting said transfer of solids from said internal contacting zone to said stripping zone by dense phase solids overflow from the internal zone, centrifugally separating solids from the light phase in the separation zone and returning said centrifugally separated solids as a downwardly moving column to said stripping zone and effecting said centrifugal separation at such elevation that the pressure head of the column will balance the pressure drop in the centrifugal separation step.

19. In combination with a shell, a plurality of gas-solid separating devices disposed within said shell near the upper portion thereof, a conduit terminating in the bottom portion of said shell and adapted to introduce a gas carrying finely divided particles into said shell, said shell being of a diameter sufficient to cause said particles to settle into a fluidized body in the bottom portion of said shell, an elongated pipe disposed within said shell and in communication with said solid-gas separating devices for receiving separated solid particles from said separating devices and for delivering the separated particles to said shell below the level of the fluidized mass of solid particles therein, said pipe in operation normally containing solid particles to prevent the gases from by-passing said separating devices.

20. A method of carrying out reactions which comprises continuously introducing contact particles and a gaseous fluid into a reaction zone and maintaining them in said zone for the desired time to effect the desired extent of reaction, the velocity of the gaseous fluid in said zone being such as to produce a relatively dense contact particle mixture, withdrawing contact particles in a relatively dense phase from the bottom of said reaction zone and passing them to a standpipe to provide a column of fluidized contact particles supplying a head of pressure, cooling the withdrawn contact particles, adding a gas to the withdrawn contact particle mixture to produce a less dense suspension and utilizing the head of pressure to pass the cooled less dense contact particle mixture directly to the reaction zone, and removing contact particles and gaseous fluid from said reaction zone.

21. The method of operating a powdered catalyst conversion system which comprises introducing powdered catalyst into an upflowing gas or vapor contacting zone, passing gases or vapors upwardly through said zone at such a rate as to produce a dense turbulent phase of suspended catalyst therein and a light dispersed catalyst phase above said dense turbulent catalyst phase, maintaining an aerated catalyst bed in said zone below the dense turbulent suspended catalyst phase, separating catalyst from gases or vapors in the dispersed catalyst phase, and returning said separated catalyst to said aerated catalyst bed at a point below the upper level thereof while maintaining said separated catalyst out of contact with said dispersed phase and said turbulent dense phase respectively.

22. The method of effecting catalytic conversion of hydrocarbons by means of powdered catalyst which method comprises continously introducing a stream of hydrocarbons at the base of a first contacting zone, continuously introducing catalyst into said zone, maintaining a dense phase of suspended catalyst in said zone, continuously removing conversion products from said zone at a point above the level of said dense suspended catalyst phase, continuously transferring catalyst from the dense catalyst phase in the first contacting zone to an adjacent stripping zone, passing the stripping gas through said stripping zone and into said first contacting zone, downwardly withdrawing catalyst from said stripping zone, transferring withdrawn catalyst to a second contacting zone, introducing air at the base of the second contacting zone, maintaining a dense suspended catalyst phase in said second contacting zone, withdrawing gas from said second contacting zone at a point above the level of the dense catalyst phase therein, continuously withdrawing catalyst from the dense phase in said second contacting zone as a downwardly moving aerated column, transferring catalyst from the base of of said colum back to the first contacting zone, maintaining one of said contacting zones at a substantially higher level than the other contacting zone, and effecting catalyst circulation throughout the system by gas lift and gravity whereby abrasion of catalyst by mechanical impellers is entirely avoided.

23. The method of operating a catalytic conversion system which comprises passing hydrocarbon vapors upwardly through a first zone containing powdered catalyst at such a rate as to produce a dense, turbulent suspended catalyst phase and a light upper dispersed catalyst phase at the top of said zone, passing regeneration gases upwardly through a second zone containing powdered catalyst at such a rate as to produce a dense, turbulent suspended catalyst phase and a light upper dispersed catalyst phase at the top of said zone, withdrawing catalyst from the first dense phase, stripping the catalyst and introducing the stripped catalyst into the second dense phase, withdrawing catalyst from the second dense phase, stripping the last-named withdrawn catalyst with steam and introducing it back to the first dense phase, withdrawing gases and vapors from the light upper phases at the top of each zone, separating catalyst from said gases and vapors being withdrawn, and returning the separated catalyst to the system.

24. A process for the catalytic conversion of hydrocarbons which comprises introducing particles of a powdered catalytic material to a catalytic conversion zone, flowing vapors of the hydrocarbons undergoing conversion upwardly through said zone at a velocity adapted to form a dense turbulent phase of the catalyst particles in said zone, adding fresh powdered catalyst to said dense phase and withdrawing corresponding amounts of used catalyst therefrom at a rate adapted to maintain the average catalytic activity of said mass of catalyst particles at a suitable value, effecting said withdrawal of used catalyst from the conversion zone separate from the vaporous conversion products through a catalyst withdrawal passageway opening directly into the lower portion of said dense phase, continually introducing hot used catalyst thus withdrawn under the pressure head exerted by the dense phase of catalyst in the conversion zone above the inlet to the catalyst withdrawal passageway to a stream of oxygen-containing gas passing to a regeneration zone, flowing said oxygen-containing gas through said regeneration zone at a velocity adapted to form a dense turbulent phase of the catalyst in said zone, withdrawing regenerated catalyst from said regeneration zone separately from the gaseous regeneration products through a catalyst withdrawal passageway opening directly into the lower portion of said last mentioned dense phase, and continually returning the hot regenerated catalyst under the pressure head exerted by the dense phase of catalyst in the regeneration zone above the inlet to the last mentioned catalyst withdrawal passageway to the hydrocarbon vapors passing to the conversion zone.

25. The method of operating a powdered catalyst conversion system which comprises introducing powdered catalyst into an upflow gas or vapor contacting zone, passing gases or vapors upwardly through said zone at such a rate as to produce a dense turbulent phase of suspended catalyst in a substantial part of said zone and a light dispersed catalyst phase at the top of said zone, continuously withdrawing gases or vapors from an upper part of the light dispersed catalyst phase, continuously withdrawing catalyst as a downwardly moving column directly from said dense turbulent phase, passing this catalyst while still in a dense fluent condition through a stripping zone in said column, countercurrently stripping reactable gases from the catalyst in said stripping zone with an inert gas, introducing catalyst from said stripping zone to a second contacting zone and returning catalyst from said second contacting zone to said first-named contacting zone.

FRED W. SCHEINEMAN.

REFERENCES CITED

The following references are of record in the file of this patent:

UNITED STATES PATENTS

| Number | Name | Date |
|---|---|---|
| 1,475,502 | Manning | Nov. 27, 1923 |
| 1,845,058 | Pier | Feb. 16, 1932 |
| 1,984,380 | Odell | Dec. 18, 1934 |
| 2,231,231 | Subkow | Feb. 11, 1941 |
| 2,231,424 | Huppke | Feb. 11, 1941 |
| 2,239,801 | Voorhees | Apr. 29, 1941 |
| 2,247,097 | Menshin | June 24, 1941 |
| 2,253,486 | Belchetz | Aug. 19, 1941 |
| 2,271,148 | Becker et al. | Jan. 27, 1942 |
| 2,289,329 | Prickett | July 7, 1942 |
| 2,305,569 | Degnen | Dec. 15, 1942 |